US012549895B2

(12) United States Patent
Lawrence et al.

(10) Patent No.: US 12,549,895 B2

(45) Date of Patent: Feb. 10, 2026

(54) DYNAMIC WIND DETECTION FOR ADAPTIVE NOISE CANCELLATION (ANC)

(71) Applicant: Cirrus Logic International Semiconductor Ltd., Edinburgh (GB)

(72) Inventors: Wilbur Lawrence, Tempe, AZ (US); John Bryan-Merrett, Edinburgh (GB)

(73) Assignee: Cirrus Logic, Inc., Austin, TX (US)

( * ) Notice: Subject to any disclaimer, the term of this patent is extended or adjusted under 35 U.S.C. 154(b) by 487 days.

(21) Appl. No.: 18/067,545

(22) Filed: Dec. 16, 2022

(65) Prior Publication Data

US 2024/0205596 A1 Jun. 20, 2024

(51) Int. Cl.

*H04R 3/00* (2006.01)
*G10K 11/178* (2006.01)
*G10L 21/0216* (2013.01)

(52) U.S. Cl.

CPC ....... *H04R 3/005* (2013.01); *G10K 11/17823* (2018.01); *G10K 11/1783* (2018.01); *G10L 21/0216* (2013.01); *G10L 2021/02166* (2013.01); *H04R 2410/07* (2013.01)

(58) Field of Classification Search

CPC .... H04R 3/005; H04R 2410/07; H04R 1/406; G10K 11/17823; G10K 11/1783; G10L 21/0216; G10L 2021/02166

See application file for complete search history.

(56) References Cited

U.S. PATENT DOCUMENTS 10,714,073 B1 * 7/2020 Rui .................. G10K 11/17813
2007/0009127 A1 * 1/2007 Klemenz ............. H04R 25/407 381/317

* cited by examiner

*Primary Examiner* — Vivian C Chin
*Assistant Examiner* — Annabelle Kang
(74) *Attorney, Agent, or Firm* — Norton Rose Fulbright US LLP

(57) ABSTRACT

Noise cancellation operations consume battery power, and thus techniques for reducing power consumption by performing power management in active noise cancellation in consumer devices are beneficial for the user. One example power management technique described according to embodiments of this disclosure allow wind noise detection to switch between a high-power higher-accuracy operation and a low-power lower-accuracy operation. For example, multiple microphones may be available on the personal device for detecting wind noise, in which using multiple microphones increases accuracy but also increases battery consumption. A personal device may switch between using a single microphone and multiple microphones based on environmental conditions to provide improved performance in certain environmental conditions and reduced power consumption in other environmental conditions.

18 Claims, 6 Drawing Sheets

DYNAMIC WIND DETECTION FOR ADAPTIVE NOISE CANCELLATION (ANC)

FIELD OF THE DISCLOSURE

The instant disclosure relates to methods, apparatuses, and implementations concerning or relating to voice applications in an audio device. Applications may include detection and reduction of wind noise using at least two microphones of an audio device.

BACKGROUND

Wireless telephones, such as mobile/cellular telephones, cordless telephones, and other consumer audio devices, such as MP3 players, are in widespread use. User satisfaction with these devices for listening to audio and taking part in voice or video conversations is based on intelligibility of the audio. Intelligibility can be improved by providing adaptive noise canceling (ANC) using a reference microphone to measure ambient acoustic events and then using signal processing to insert an anti-noise signal into the output of the device to cancel the ambient acoustic events.

SUMMARY

Personal devices, such as wireless telephones, cordless telephones, consumer audio devices, conferencing equipment, and mobile computing devices (e.g., laptops and tablets), are generally battery-powered. Power management of features within the device are used to extend battery life and improve user satisfaction with their devices. Noise cancellation operations consume battery power, and thus techniques for reducing power consumption by performing power management in active noise cancellation in consumer devices are beneficial for the user. One example power management technique described according to embodiments of this disclosure allow wind noise detection to switch between a high-power higher-accuracy operation and a low-power lower-accuracy operation. For example, multiple microphones may be available on the personal device for detecting wind noise, in which using multiple microphones increases accuracy but also increases battery consumption. A personal device may switch between using a single microphone and multiple microphones based on environmental conditions to provide improved performance in certain environmental conditions and reduced power consumption in other environmental conditions. Although certain personal devices are described in certain embodiments of this disclosure, techniques described herein may be applied to many audio devices, including mobile devices such as hearing aids, cochlear implants, mobile telephones, headphones, and earbuds, which may benefit from detecting the presence or intensity of wind noise in real time.

Wind noise detection may be used to improve active noise cancellation (ANC). Noise cancellation is the process of reducing (e.g., attenuating) unwanted noise from an environment, such as to the point of the noise being barely or not noticeable to a human listener. Unwanted noise can include ambient noise such as wind noise, but also musical instruments or audio speakers in the room or on the stage, noise from the audio system, or external factors such as generators, machinery, road noise, or the like. Active noise cancellation uses a microphone to capture the outside noise (such as from people speaking nearby, or the more-general noise in a car or airplane's cabin), and invert this noise signal to generate an anti-noise signal and add the anti-noise signal to the overall audio signal output to the user through speakers or headphones. The original, undesired noise is cancelled out by this anti-noise signal.

According to one embodiment, a method may include configuring a microphone array comprising a first microphone and a second microphone to operate in a first configuration; detecting a first criteria comprising a presence of wind noise is satisfied based on a first audio input signal received from the microphone array; configuring the microphone array in a second configuration based on detecting the first criteria; and determining an output audio signal based on the microphone array by performing noise cancellation corresponding to the second configuration.

In certain embodiments, the different configurations include different numbers of microphones activated. For example, in a first configuration only one microphone may be active to reduce power consumption and in a second configuration two microphones may be active to improve wind noise detection accuracy. In another example, a first configuration may include multiple but a lesser number (<N) of microphones activated than a second configuration in which N microphones are activated.

In certain embodiments, the dynamic re-configuration between first, second, and additional configurations may include hysteresis to reduce false switching. For example, a delay may be added to the detection criteria for switching between configurations to reduce false transitions and resulting instability in wind detection and unnecessary, increased power consumption. For example, a certain criteria must be held for a certain period of time before switching configurations. When wind noise level is part of a criteria for switching configurations, a wind noise level above a threshold must exceed the threshold for a predetermined period of time before switching from the first configuration to the second configuration.

The method may be embedded in a computer-readable medium as computer program code comprising instructions that cause a processor to perform the steps of the method. The computer program code may be embedded in a medium as part of an apparatus, in which the apparatus includes a processor that is configured by the computer program code to perform the method. An example of such an apparatus is a memory coupled to a processor or audio controller, in which the memory includes the computer program code corresponding methods disclosed herein and the processor executes the computer program code to perform the method. The method may also be embedded in an apparatus as fixed-function circuitry configured to perform the method, such as with an application-specific integrated circuit (ASIC).

According to another embodiment, an apparatus, which may be a personal device, may include a microphone array comprising a first microphone and a second microphone; and an audio controller coupled to the microphone array and configured to perform operations including determining a noise-cancelled audio signal based on one or more input audio signals from the microphone array by performing noise cancellation on the one or more input audio signals; and controlling a configuration of the microphone array as one of at least a first configuration, a second configuration, and a third configuration, wherein the first configuration comprises the first microphone being active and the second microphone being inactive, wherein the second configuration comprises the first microphone being active and the second microphone being active, and wherein the third configuration comprises the first microphone being active and the second microphone being dynamically activated and de-activated. In certain embodiments, when the configuration of the microphone array is the third configuration the audio controller may also perform operations including activating the second microphone based on detecting wind noise above a first threshold level in a first audio input signal from the first microphone.

As used herein, the term "coupled" means connected, although not necessarily directly, and not necessarily mechanically; two items that are "coupled" may be unitary with each other. The terms "a" and "an" are defined as one or more unless this disclosure explicitly requires otherwise. The term "substantially" is defined as largely but not necessarily wholly what is specified (and includes what is specified; e.g., substantially parallel includes parallel), as understood by a person of ordinary skill in the art.

The phrase "and/or" means "and" or "or". To illustrate, A, B, and/or C includes: A alone, B alone, C alone, a combination of A and B, a combination of A and C, a combination of B and C, or a combination of A, B, and C. In other words, "and/or" operates as an inclusive or.

Further, a device or system that is configured in a certain way is configured in at least that way, but it can also be configured in other ways than those specifically described.

The terms "comprise" (and any form of comprise, such as "comprises" and "comprising"), "have" (and any form of have, such as "has" and "having"), and "include" (and any form of include, such as "includes" and "including") are open-ended linking verbs. As a result, an apparatus or system that "comprises," "has," or "includes" one or more elements possesses those one or more elements, but is not limited to possessing only those elements. Likewise, a method that "comprises," "has," or "includes," one or more steps possesses those one or more steps, but is not limited to possessing only those one or more steps.

The foregoing has outlined rather broadly certain features and technical advantages of embodiments of the present invention in order that the detailed description that follows may be better understood. Additional features and advantages will be described hereinafter that form the subject of the claims of the invention. It should be appreciated by those having ordinary skill in the art that the conception and specific embodiment disclosed may be readily utilized as a basis for modifying or designing other structures for carrying out the same or similar purposes. It should also be realized by those having ordinary skill in the art that such equivalent constructions do not depart from the spirit and scope of the invention as set forth in the appended claims. Additional features will be better understood from the following description when considered in connection with the accompanying figures. It is to be expressly understood, however, that each of the figures is provided for the purpose of illustration and description only and is not intended to limit the present invention.

BRIEF DESCRIPTION OF THE DRAWINGS

For a more complete understanding of the disclosed system and methods, reference is now made to the following descriptions taken in conjunction with the accompanying drawings.

DETAILED DESCRIPTION

These example embodiments describe and illustrate various aspects of a wind noise detection system that may use two or more microphones for improved wind noise detection accuracy. The wind noise detection system may be included in personal devices and used as part of an active noise cancellation (ANC) system to improve user experience when using the personal device.

Figure 1:
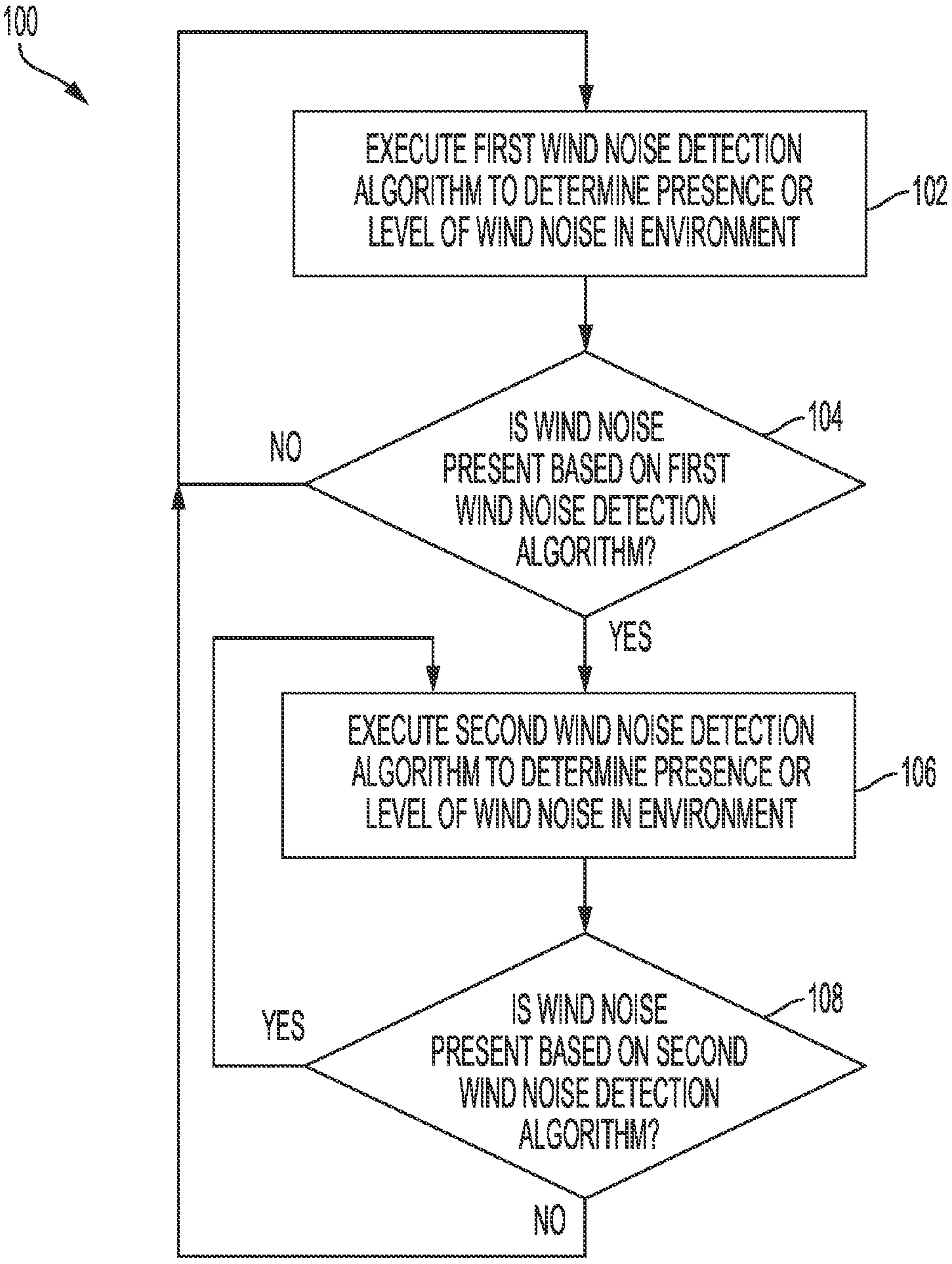
FIG. 1 is a flow chart illustrating an example method for wind noise detection according to one or more aspects of this disclosure.

FIG. 1 is a flow chart illustrating an example method for wind noise detection according to one or more aspects of this disclosure. A method 100 includes, at block 102, executing a first wind noise detection algorithm to evaluate wind noise in an environment around one or more microphones. The first wind noise detection algorithm may operate using input from one microphone. The microphones may include digital microphones coupled to an audio controller or other logic circuitry executing the wind noise detection algorithm and/or analog microphones coupled to the audio controller or other logic circuitry through an analog-to-digital converter (ADC). There are different techniques that may be employ for one microphone wind noise detection. As one example, the first wind noise detection algorithm may calculate an empirical density function (EDF) for two audio data frames recorded at two different times through one microphone. As another example, the first wind noise detection algorithm may evaluate a correlation function executed on two audio data frames recorded at two different times through one microphone. As a further example, the first wind noise detection algorithm may be based on a neural network or other trained artificial intelligence (AI) system.

At block 104, the output of the first wind noise detection algorithm is compared with one or more criteria to determine whether wind noise is present. If no wind noise is present, the method 100 may continue executing the first wind noise detection algorithm at block 102 to determine when the one or more criteria are satisfied. When wind noise is detected, the method 100 may continue to block 106. Switching to two-microphone wind noise detection (or another second wind noise detection algorithm with higher microphone count than the first wind noise detection algorithm) may improve operation of the ANC system because one microphone wind noise detection suffers from false detection in, for example, low-frequency noise environments (e.g., bus noise, car noise), particularly at higher noise levels. In conventional ANC systems when wind noise is detected, a cut-off frequency on a front-end high-pass filter (HPF) may be increased to prevent injection of turbulent wind noise in the down-stream ANC processing. False wind noise detection may thus result in less noise being cancelled by the system because the anti-noise signal generated in the ANC system will not have the cut-out low frequencies. A two-microphone system (such as may be executed as the second wind noise detection algorithm at block 106) may have less false detection events. When wind noise is likely, the decision on whether wind noise is detected may be based on the more accurate algorithm, but use of the second algorithm may be limited to certain conditions to reduce power consumption, such as when there is actual wind or when the first algorithm false detects certain low-frequency noises as wind.

In some embodiments, hysteresis may be added to the algorithm to reduce power consumption due to false-positives from wind noise detection. For example, block 106 may not be executed until block 104 is satisfied for a first predetermined period of time. Another technique for adding hysteresis may include a counting system. For example, the device may maintain a running count of the number of decisions. If a "no detect" occurs, then the count is reset to zero. If the count exceeds a tunable threshold, then the detection system may be dynamically switched to a two-microphone system from a one-microphone system.

At block 106, a second wind noise detection algorithm executes to evaluate wind noise in an environment around the microphone. The second wind noise detection algorithm may be a different wind noise algorithm than the first wind noise algorithm or the same wind noise algorithm executed with different parameters. In some embodiments, the second wind noise detection may detect wind noise based on two microphones whereas the first wind noise detection may detect wind noise based on one microphone. As one example of such an embodiment, the second wind noise detection algorithm may calculate an empirical density function (EDF) for two audio data frames recorded through two microphones at the same or different times. As another example, the second wind noise detection algorithm may evaluate a correlation function executed on two audio data frames recorded through two microphones at two different times or the same time. As a further example, the second wind noise detection algorithm may be based on a neural network or other trained artificial intelligence (AI) system.

At block 108, the output of the second wind noise detection algorithm is compared with one or more criteria to determine whether wind noise is present. If wind noise remains detected, the method 100 may continue executing the second wind noise detection algorithm at block 106 to determine when the one or more criteria are no longer satisfied. When wind noise is no longer detected, the method 100 may return to block 102 to execute the first wind noise detection algorithm. In some embodiments, hysteresis may be added to the algorithm to reduce loss of accuracy from false-negatives in wind noise detection. For example, block 106 may continue to be executed until block 108 is satisfied for a second predetermined period of time. Example values for the first and second predetermined period of time include 20-50 milliseconds.

Figure 2:
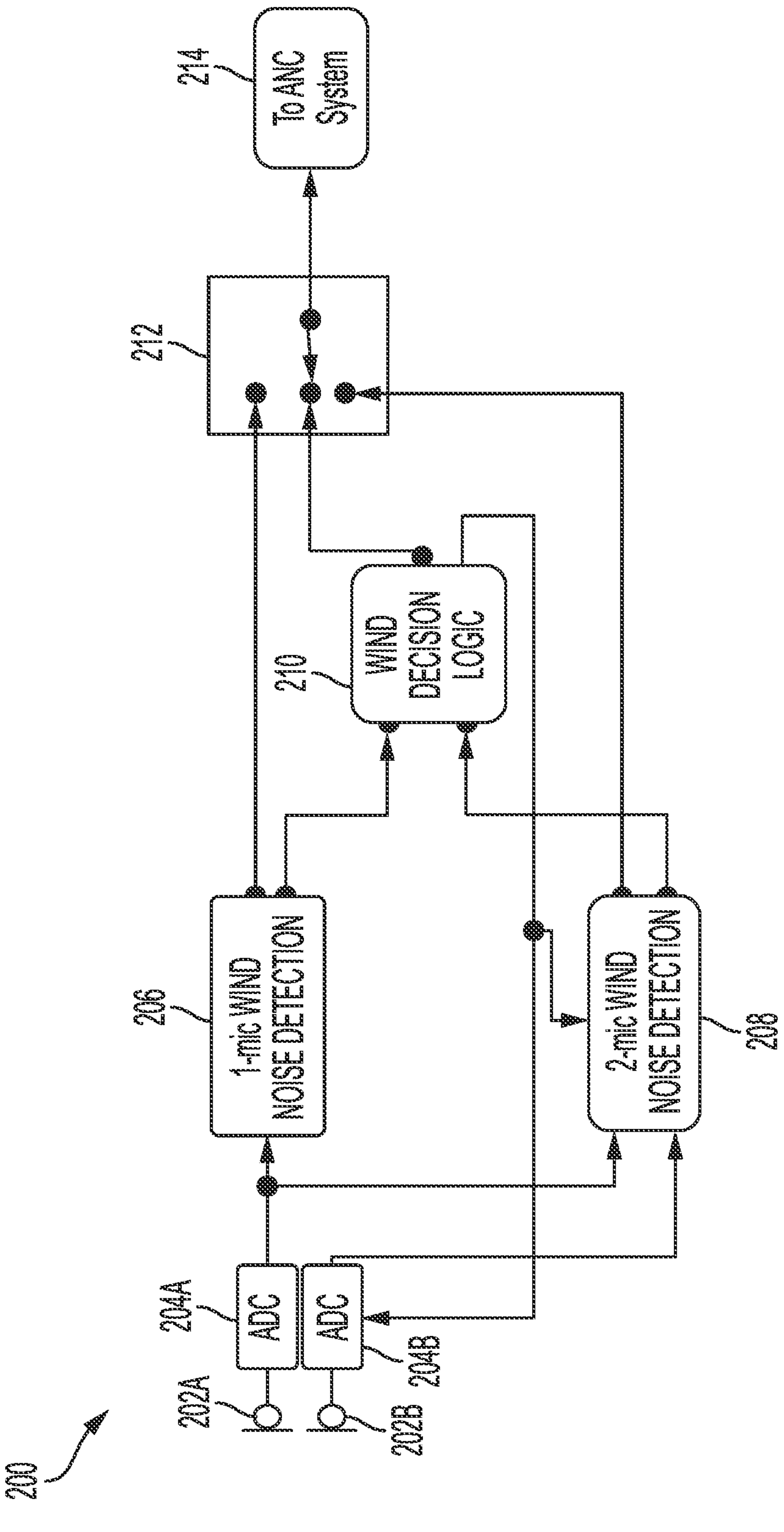
FIG. 2 is a block diagram illustrating an example system for wind noise detection according to one or more aspects of this disclosure.

One system configuration for executing two wind noise detection algorithms is shown in FIG. 2. FIG. 2 is a block diagram illustrating an example system for wind noise detection according to one or more aspects of this disclosure. System 200 implements an embodiment of a wind noise detection circuit for switching between one and two microphone configurations, in which two analog microphones are used for obtaining recordings of an environment. Microphones 202A and 202B are coupled to wind noise detection blocks 206 and 208 through analog-to-digital converters (ADC) 204A and 204B. In embodiments in which one or both of the microphones 202A and 202B are digital microphones, one or both of the ADCs 204A and 204B may be omitted. A first wind noise detection block 206 determines a presence of wind noise based on the output of microphone 202A. A first wind noise detection signal which indicates whether wind noise is detected based on the algorithm and one or more criteria set in the first wind noise detection block 206, is output from the first wind noise detection block 206 to a switch 212. The first wind noise detection block 206 may also output a first wind noise metric to wind decision logic block 210. The wind noise metric may be, for example, a confidence level in the wind noise detection signal.

The wind detection logic block 210 may also receive a second wind noise metric from a second wind noise detection block 208. The second wind noise detection block 208 determines a presence of wind noise based on the output of microphones 202A and 202B. The output is a second wind noise detection signal provided to the switch 212. The switch 212 position may be selected, such as at initialization or during a reconfiguration operation, between outputting, to an ANC system 214, the first wind noise detection signal, the second wind noise detection signal, or dynamically switching between the first wind noise detection signal or the second wind noise detection signal based on an output of the wind decision logic 210. In the dynamic mode, the wind decision logic block 210 monitors the first wind noise detection system and if certain criteria indicating the presence of wind noise are satisfied, will then activate the more accurate second wind noise detection block 208 and then push the second wind noise detection signal to the ANC system 214. If wind decision logic block 210 does not detect wind noise, then wind noise detection block 208 will not be activated and the wind decision logic block 210 will output the first wind noise detection signal to the ANC system 214. The wind decision logic 210 may also enable or disable the second wind noise detection block 208 and/or the ADC 204B based on the one or more criteria. For example, the wind decision logic 210 may disable (e.g., by powering down through a headswitch or other control) the second wind noise detection block 208 and/or the ADC 204B when wind decision logic 210 determines to output the first wind noise detection signal through the switch 212 to the ANC system 215. The wind decision logic 210 may be activated and powered-up only when the switch 202 is configured to operate with the output of wind decision logic 210 as the selected input.

Figure 3:
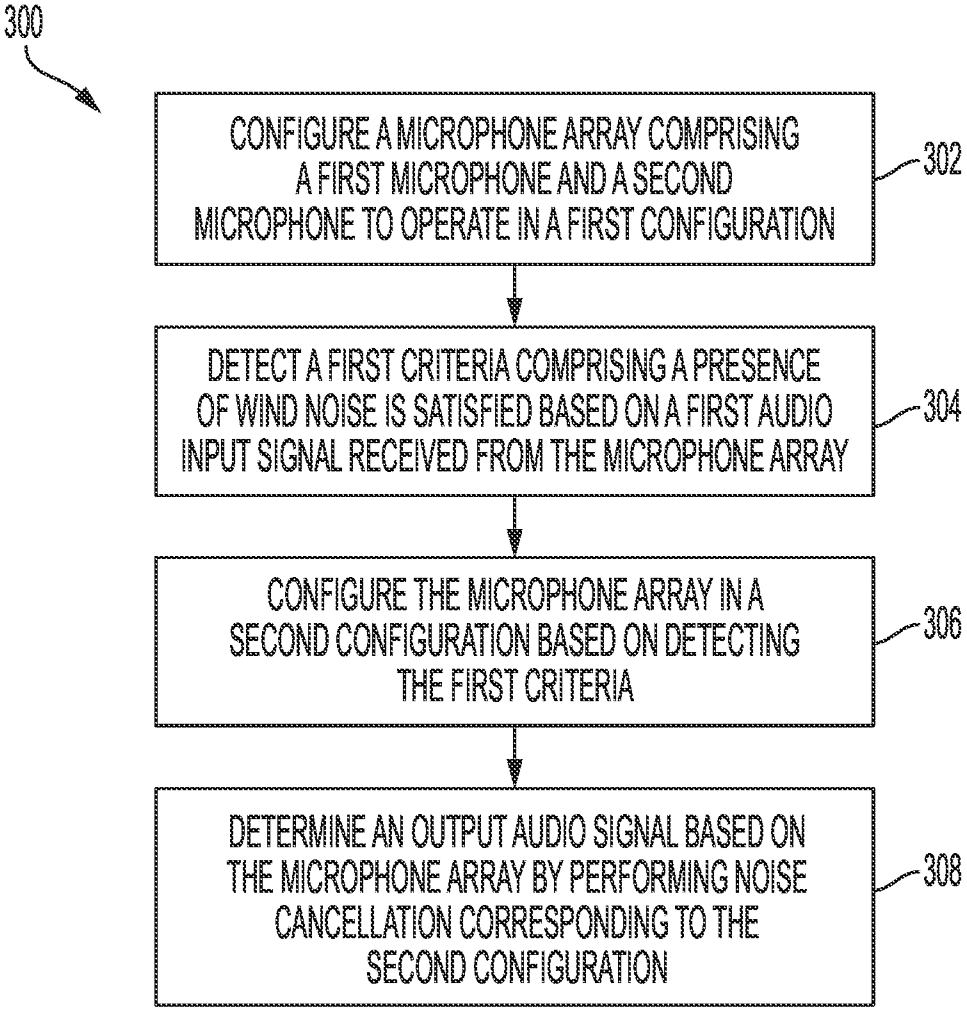
FIG. 3 is a flow chart illustrating an example method for reconfiguring microphones based on wind noise detection according to one or more aspects of this disclosure.

FIG. 3 shows an example method for operating a system with a first microphone configuration with one microphone and a second microphone configuration with two microphones, such as shown in the embodiment of FIG. 2. FIG. 3 is a flow chart illustrating an example method for reconfiguring microphones based on wind noise detection according to one or more aspects of this disclosure.

A method 300 begins at block 302 with configuring a microphone array comprising a first microphone and a second microphone in a first configuration. Referring to the example of FIG. 2, the microphone array may include the microphones 202A and 202B, and the first configuration may activate microphone 202A and associated ADC 204A and first wind noise detection block 206. At block 304, the presence of wind noise is detected based on satisfying a first criteria based on a first audio input signal received from the microphone array. For example, wind decision logic 210 may apply a threshold to the first wind noise detection metric to determine the presence of wind noise above a threshold level. In response to satisfying the first criteria, the method 300 continues to block 306 with configuring the microphone array in a second configuration. For example, the wind decision logic 210 may activate the second ADC 204B and associated second wind noise detection block 208. At block 308, an output audio signal may be based on the microphone array by performing noise cancellation corresponding to the second configuration. The ANC system 214 may then determine an output audio signal by determining an anti-noise signal to cancel the wind noise from an output audio signal that may be provided to speakers and/or headphones. Referring to FIG. 2, the operation of FIG. 6 may be performed while the switch 212 selects the wind decision logic 210 as the input for passing through to the ANC system 214 a dynamic selection of either the first or second wind detection signal. The system 200 of FIG. 2 may also be reconfigured into a static operation mode such that switch 212 selects either of the first or second wind detection signal.

Figure 4:
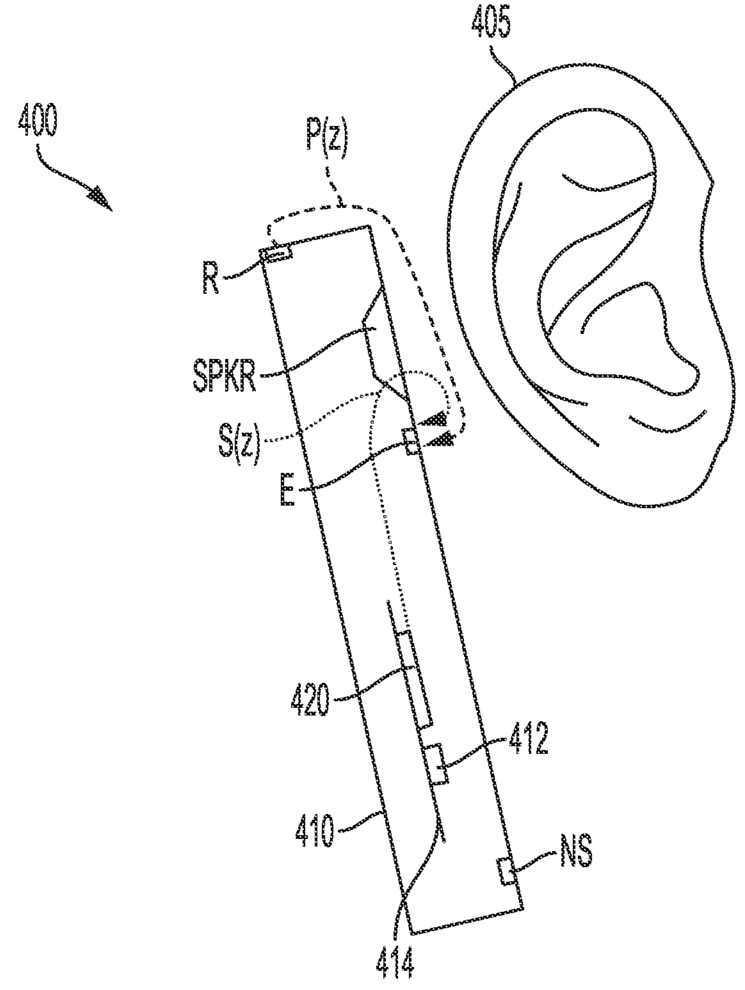
FIG. 4 is an illustration of an example wireless telephone with active noise cancellation (ANC) according to one or more aspects of this disclosure.

An example ANC system 214 is illustrated and described with reference to FIG. 4 and FIG. 5. FIG. 4 is an illustration of an example wireless telephone with active noise cancellation (ANC) according to one or more aspects of this disclosure. FIG. 4 shows an example wireless telephone 400 in proximity to a human ear 405. Illustrated wireless telephone 400 is an example of a device in which techniques illustrated herein may be employed, but it is understood that not all of the elements or configurations embodied in illustrated wireless telephone 400, or in the circuits depicted in subsequent illustrations, are required. Wireless telephone 400 includes a transducer, such as speaker SPKR, that reproduces distant speech received by wireless telephone 400, along with other local audio events such as ringtones, stored audio program material, near-end speech, sources from web-pages or other network communications received by wireless telephone 400 and audio indications such as battery low and other system event notifications. A near-speech microphone NS is provided to capture near-end speech, which is transmitted from wireless telephone 400 to the other conversation participant(s).

Wireless telephone 400 includes adaptive noise canceling (ANC) circuits and features that inject an anti-noise signal into speaker SPKR to improve intelligibility of the distant speech and other audio reproduced by speaker SPKR. A reference microphone R is provided for measuring the ambient acoustic environment and is positioned away from the typical position of a user/talker's mouth, so that the near-end speech is minimized in the signal produced by reference microphone R. A third microphone, error microphone E, is provided in order to further improve the ANC operation by providing a measure of the ambient audio combined with the audio signal reproduced by speaker SPKR close to car 405, when wireless telephone 400 is in close proximity to car 405. Exemplary circuit 414 within wireless telephone 410 includes an audio CODEC integrated circuit 420 that receives the signals from reference microphone R, near speech microphone NS, and error microphone E and interfaces with other integrated circuits such as an radio frequency (RF) integrated circuit 412 containing the wireless telephone transceiver. In other implementations, the circuits and techniques disclosed herein may be incorporated in a single integrated circuit that contains control circuits and other functionality for implementing the entirety of the personal audio device, such as an MP3 player-on-a-chip integrated circuit.

In general, the ANC techniques disclosed herein measure ambient acoustic events (as opposed to the output of speaker SPKR and/or the near-end speech) impinging on reference microphone R. and by also measuring the same ambient acoustic events impinging on error microphone E, the ANC processing circuits of illustrated wireless telephone 410 adapt an anti-noise signal generated from the output of reference microphone R to have a characteristic that minimizes the amplitude of the ambient acoustic events present at error microphone E. One example of an ambient acoustic event includes wind noise as described herein. Because acoustic path P(z) extends from reference microphone R to error microphone E, the ANC circuits may estimate acoustic path P(z) combined with removing effects of an electro-acoustic path S(z). Electro-acoustic path S(z) represents the response of the audio output circuits of CODEC IC 420 and the acoustic/electric transfer function of speaker SPKR including the coupling between speaker SPKR and error microphone E in the particular acoustic environment. Electro-acoustic path S(z) is affected by the proximity and structure of car 405 and other physical objects and human head structures that may be in proximity to wireless telephone 410, when wireless telephone 410 is not firmly pressed to car 405. While the illustrated wireless telephone 410 includes a two microphone ANC system with a third near speech microphone NS, other systems that do not include separate error and reference microphones may implement the above-described techniques. Alternatively, near speech microphone NS may be used to perform the function of the reference microphone R in the above-described system. Finally, in personal audio devices designed only for audio playback, near speech microphone NS will generally not be included, and the near-speech signal paths in the circuits described in further detail below may be omitted. Although a telephone 410 is shown in FIG. 4, wind noise detection and active noise cancellation may be incorporated into other personal devices, such as a headset.

Figure 5:
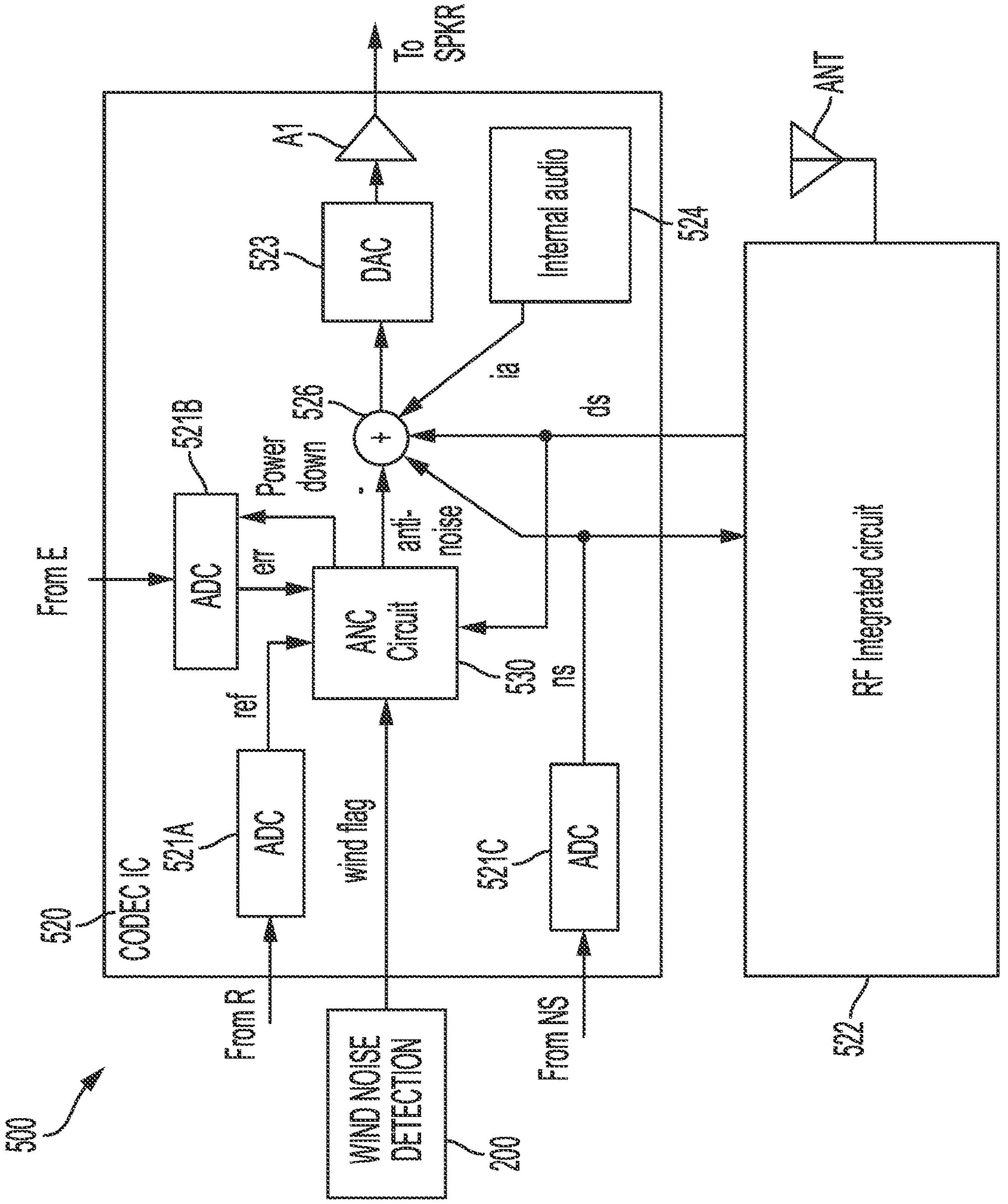
FIG. 5 is a block diagram illustrating an example active noise cancellation (ANC) system for use in a personal device according to one or more aspects of this disclosure.

Referring now to FIG. 5, circuits within wireless telephone 410 are shown in a block diagram. FIG. 5 is a block diagram illustrating an example active noise cancellation (ANC) system for use in a personal device according to one or more aspects of this disclosure. CODEC integrated circuit (IC) 520 includes an analog-to-digital converter (ADC) 521A for receiving the reference microphone signal and generating a digital representation ref of the reference microphone signal, an ADC 521B for receiving the error microphone signal and generating a digital representation err of the error microphone signal, and an ADC 521C for receiving the near speech microphone signal and generating a digital representation of near speech microphone signal ns. CODEC IC 520 generates an output for driving speaker SPKR or headphones from an amplifier A1, which amplifies the output of a digital-to-analog converter (DAC) 523 that receives the output of a combiner 526. Combiner 526 combines audio signals from internal audio sources 524, the anti-noise signal generated by an ANC circuit 530, which by convention has the same polarity as the noise in reference microphone signal ref and is therefore subtracted by combiner 526. Additionally, combiner 526 also combines a portion of near speech signal ns so that the user of wireless telephone 410 hears their own voice in proper relation to downlink speech ds, which is received from a radio frequency (RF) integrated circuit 522. The downlink speech ds and internal audio are provided to combiner 526 to provide source audio (ds+ia), so that source audio (ds+ia) may be presented to estimate acoustic path S(z) with a secondary path adaptive filter within ANC circuit 530. Near speech signal ns is also provided to RF integrated circuit 522 and is transmitted as uplink speech to the service provider via antenna ANT. The ANC circuit 530 may also receive a wind noise detection signal from a wind noise detection system such as the system 200 of FIG. 2. The wind noise detection signal may cause the ANC circuit 530 to adapt one or more gains or other parameters for generating the anti-noise signal to improve wind noise cancellation.

ANC circuit 530 includes features to measure the ambient background noise, and determine when a low-power or power-down mode may be set for at least a portion of ANC circuit 530. Further, ANC circuit 530 provides a control signal power down that may be used to signal to other circuits within personal audio device 510 that ANC circuit 530 has determined that ANC operation is not needed. For example, control signal power down might be used to control an operational state of ADC 521B that provides error microphone signal err, during times that reference microphone signal ref indicates that the background noise level is low and ANC operation is halted. When ANC circuit 530 determines to power down ANC operations, the wind noise detection system 200 may likewise be shut down or placed into a first configuration with a minimum number of operational microphones.

A wind noise detection system that switches between different configurations may be used in a mobile device to reduce power consumption while still providing high accuracy wind detection. For example, a two (or N) microphone configuration for higher-accuracy wind detection may be activated when battery charge level is high or the device is plugged in, wherein N may be an integer of two or greater. A one (or M<N) microphone configuration for lower-accuracy wind detection may be activated when battery charge level is low and the device is not plugged in wherein M may be an integer of one or greater. As another example, when certain power criteria are satisfied (such as the mobile device being on battery power or low battery level), the mobile device may dynamically reconfigure between the N microphone and M microphone configurations based on detection of wind noise, with the N microphone configuration used when wind noise is detected to improve ANC performance. The dynamic operation allows the ANC system to reduce power consumption when the wind noise is not detected to conserve battery charge.

Figure 6:
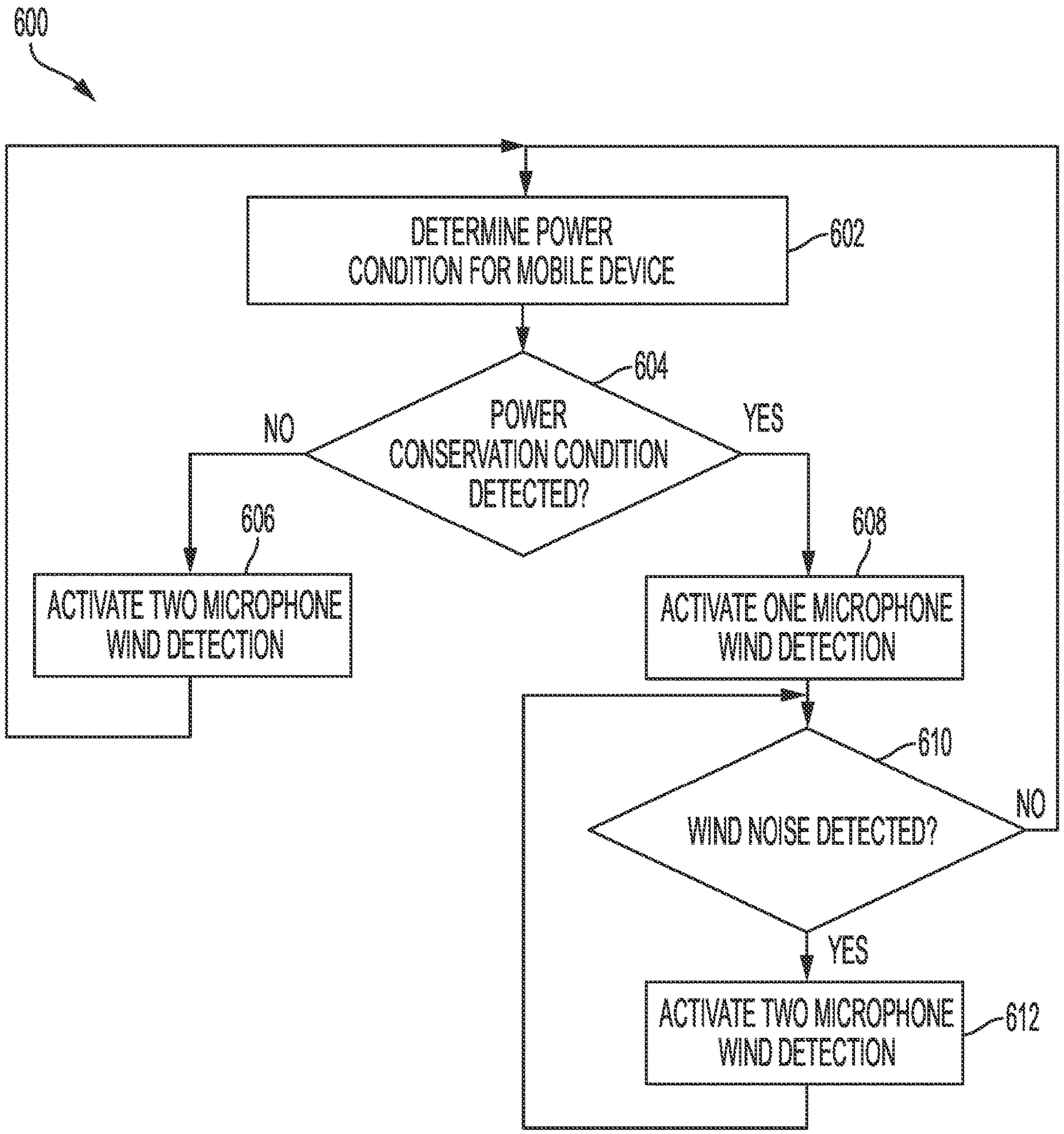
FIG. 6 is a flow chart illustrating an example method for reconfiguring microphones in a personal device based on power status according to one or more aspects of the disclosure.

FIG. 6 is a flow chart illustrating an example method for reconfiguring microphones in a personal device based on power status according to one or more aspects of the disclosure. A method 600 includes at block 602 determining a power condition of a mobile device, based on one or more of a battery charge level (such as measured from a battery voltage), a power source (battery or plug), and/or a current battery load (such as measured from a discharge current). At block 604, the power condition is evaluated to determine if a power conservation condition is detected. The evaluation of block 60 may include comparing one of the power conditions or a combined power condition score against user-programmable criteria. For example, the user may specify a low battery level condition at 35% for a power conservation condition. When no power conservation condition is detected, the method 600 may continue to block 606 to activate two microphone wind detection. When the power conservation condition is detected, the method 600 may continue to block 608 to activate one microphone wind detection. When wind noise is detected at block 610 based on an output of the one-microphone wind detection, the method 600 continues to block 612 to activate two microphone wind detection. Although only two outcomes are described based on power conservation as shown in FIG. 6, additional power states may be configured with different operating configurations. For example, in some embodiments, a full battery may configure the system for two-microphone wind noise detection, and when the battery remaining charge level reaches 35%, the system reconfigures for dynamic switching between one-microphone and two-microphone wind noise detection, and when the battery charge level reaches 20%, the system reconfigures for one-microphone wind noise detection.

Although wind noise detection is described in embodiments of this disclosure, the dynamic reconfiguration of a system to increase or decrease number of active microphones or other aspects of microphone configuration may be applied to other systems using microphone input. Additionally, the microphone configurations, such as configuration of ADCs 204A and 204B may be reconfigured between low, mid, standard, and Hi-Fi modes. The different configurations may provide different valances of power consumption, signal-to-noise (SNR), and/or total harmonic distortion (THD).

The schematic flow chart diagrams of FIG. 1, FIG. 3, and FIG. 6 are generally set forth as a logical flow chart diagram. As such, the depicted order and labeled steps are indicative of aspects of the disclosed method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagram, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

The operations described above as performed by a controller, such as an audio controller, may be performed by any circuit configured to perform the described operations. Such a circuit may be an integrated circuit (IC) constructed on a semiconductor substrate and include logic circuitry, such as transistors configured as logic gates, and memory circuitry, such as transistors and capacitors configured as dynamic random access memory (DRAM), electronically programmable read-only memory (EPROM), or other memory devices. The logic circuitry may be configured through hard-wire connections or through programming by instructions contained in firmware. Further, the logic circuitry may be configured as a general purpose processor capable of executing instructions contained in software and/or firmware.

If implemented in firmware and/or software, functions described above may be stored as one or more instructions or code on a computer-readable medium. Examples include non-transitory computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise random access memory (RAM), read-only memory (ROM), electrically-erasable programmable read-only memory (EEPROM), compact disc read-only memory (CD-ROM) or other optical disk storage, magnetic disk storage or other magnetic storage devices, or any other medium that can be used to store desired program code in the form of instructions or data structures and that can be accessed by a computer. Disk and disc includes compact discs (CD), laser discs, optical discs, digital versatile discs (DVD), floppy disks and Blu-ray discs. Generally, disks reproduce data magnetically, and discs reproduce data optically. Combinations of the above should also be included within the scope of computer-readable media.

In addition to storage on computer readable medium, instructions and/or data may be provided as signals on transmission media included in a communication apparatus. For example, a communication apparatus may include a transceiver having signals indicative of instructions and data. The instructions and data are configured to cause one or more processors to implement the functions outlined in the claims.

Although the present disclosure and certain representative advantages have been described in detail, it should be understood that various changes, substitutions and alterations can be made herein without departing from the spirit and scope of the disclosure as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the present disclosure, processes, machines, manufacture, compositions of matter, means, methods, or steps, presently existing or later to be developed that perform substantially the same function or achieve substantially the same result as the corresponding embodiments described herein may be utilized. Accordingly, the appended claims are intended to include within their scope such processes, machines, manufacture, compositions of matter, means, methods, or steps.

What is claimed is:

1. A method, comprising:

configuring a microphone array comprising a first microphone and a second microphone to operate in a first configuration;

detecting a first criteria comprising a presence of wind noise is satisfied based on a first audio input signal received from the microphone array;

configuring the microphone array in a second configuration based on detecting the first criteria; and determining an output audio signal based on the microphone array by performing noise cancellation corresponding to the second configuration, wherein configuring the microphone array to operate in the first configuration comprises activating the first microphone and de-activating the second microphone and configuring the microphone array to operate in the second configuration comprises activating the second microphone.

2. The method of claim 1, further compromising:

detecting a second criteria comprising wind noise below a threshold level is satisfied while the microphone array is configured in the second configuration; and configuring the microphone array in the first configuration based on detecting the second criteria.

3. The method of claim 2, wherein detecting the second criteria comprises determining a lack of wind noise is based on a first input audio signal from the first microphone and a second input audio signal from the second microphone.

4. The method of claim 2, wherein:

configuring the microphone array in the first configuration is based on detecting the second criteria is satisfied for a first predetermined period of time; and configuring the microphone array in the second configuration is based on detecting the first criteria is satisfied for a second predetermined period of time.

5. The method of claim 4, further comprising:

detecting a third criteria; and configuring the microphone array in a third configuration based on detecting the third criteria, wherein detection of the second criteria does not change the microphone array from the third configuration.

6. The method of claim 5, wherein detecting the third criteria comprises detecting a power profile of a device comprising the first microphone and the second microphone meets a predetermined status.

7. The method of claim 1, wherein detecting the presence of wind noise comprises:

determining a wind metric based on the first audio input signal; and determining whether the wind metric exceeds a threshold level.

8. The method of claim 1, wherein performing noise cancellation corresponding to the second configuration comprises:

receiving an error microphone signal;

receiving a reference microphone signal; and determining the audio output signal based on the error microphone signal and the reference microphone signal to cancel at least a portion of the wind noise.

9. An apparatus, comprising:

an audio controller configured to perform steps comprising:

configuring a microphone array comprising a first microphone and a second microphone to operate in a first configuration;

detecting a first criteria comprising a presence of wind noise is satisfied based on a first audio input signal received from the microphone array;

configuring the microphone array in a second configuration based on detecting the first criteria; and determining an output audio signal based on the microphone array by performing noise cancellation corresponding to the second configuration, wherein configuring the microphone array to operate in the first configuration comprises activating the first microphone and de-activating the second microphone and configuring the microphone array to operate in the second configuration comprises activating the second microphone.

10. The apparatus of claim 9, further compromising:

detecting a second criteria comprising wind noise below a threshold level is satisfied while the microphone array is configured in the second configuration; and configuring the microphone array in the first configuration based on detecting the second criteria.

11. The apparatus of claim 10, wherein detecting the second criteria comprises determining a lack of wind noise is based on a first input audio signal from the first microphone and a second input audio signal from the second microphone.

12. The apparatus of claim 10, wherein:

configuring the microphone array in the first configuration is based on detecting the second criteria is satisfied for a first predetermined period of time; and configuring the microphone array in the second configuration is based on detecting the first criteria is satisfied for a second predetermined period of time.

13. The apparatus of claim 9, wherein detecting the presence of wind noise comprises:

determining a wind metric based on the first audio input signal; and determining whether the wind metric exceeds a threshold level.

14. An apparatus, comprising:

a microphone array comprising a first microphone and a second microphone;

an audio controller coupled to the microphone array and configured to perform steps comprising:

determining a noise-cancelled audio signal based on one or more input audio signals from the microphone array by performing noise cancellation on the one or more input audio signals;

controlling a configuration of the microphone array as one of at least a first configuration, a second configuration, and a third configuration, wherein the first configuration comprises the first microphone being active and the second microphone being inactive, wherein the second configuration comprises the first microphone being active and the second microphone being active, and wherein the third configuration comprises the first microphone being active and the second microphone being dynamically activated and deactivated, and when the configuration of the microphone array is the third configuration:

activating the second microphone based on detecting wind noise above a first threshold level in a first audio input signal from the first microphone.

15. The apparatus of claim 14, wherein when the configuration of the microphone array is in the third configuration, the audio controller is further configured to perform steps comprising:

de-activating the second microphone based on detecting wind noise below a second threshold level based on the first audio input signal and a second audio input signal from the second microphone.

16. The apparatus of claim 14, wherein detecting wind noise comprises determining a wind metric based on at least one of the one or more input audio signals.

17. The apparatus of claim 14, wherein the apparatus comprises a headset.

18. The apparatus of claim 14, wherein the apparatus comprises a mobile phone.

* * * * *